United States Patent
Iwashita et al.

(10) Patent No.: US 7,847,502 B2
(45) Date of Patent: Dec. 7, 2010

(54) DEVICE AND METHOD FOR CONTROLLING MACHINE TOOL

(75) Inventors: Yasusuke Iwashita, Yamanashi (JP);
Tadashi Okita, Yamanashi (JP);
Hiroyuki Kawamura, Yamanashi (JP);
Chengbin Ma, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 258 days.

(21) Appl. No.: 12/003,818

(22) Filed: Jan. 2, 2008

(65) Prior Publication Data
US 2008/0164834 A1 Jul. 10, 2008

(30) Foreign Application Priority Data
Jan. 4, 2007 (JP) ............................ 2007-000132
Feb. 19, 2007 (JP) ............................ 2007-038435

(51) Int. Cl.
*G05B 19/10* (2006.01)
(52) U.S. Cl. .................... 318/567; 318/568.22; 318/632
(58) Field of Classification Search ................ 318/567, 318/568.22, 569, 571, 600, 632
See application file for complete search history.

(56) References Cited

U.S. PATENT DOCUMENTS

| | | | |
|---|---|---|---|
| 4,723,219 A * | 2/1988 | Beyer et al. | 700/190 |
| 4,943,759 A | 7/1990 | Sakamoto et al. | |
| 6,069,463 A | 5/2000 | Umeda et al. | |
| 6,257,348 B1 * | 7/2001 | Momochi et al. | 173/1 |
| 6,534,944 B2 * | 3/2003 | Toyozawa et al. | 318/625 |
| 2003/0060909 A1 * | 3/2003 | Yamato | 700/90 |
| 2006/0018725 A1 * | 1/2006 | Ichino et al. | 409/131 |
| 2006/0184256 A1 * | 8/2006 | Iwashita et al. | 700/46 |

FOREIGN PATENT DOCUMENTS

| | | |
|---|---|---|
| JP | 60-052278 | 3/1985 |
| JP | 63-314606 | 12/1988 |
| JP | 9-222910 | 8/1997 |
| JP | 2000-243811 | 9/2000 |

OTHER PUBLICATIONS

Japanese Notice of Reasons for Rejection mailed Aug. 19, 2008 issued in Japanese Application No. 2007-038435 (including a partial translation thereof).

* cited by examiner

*Primary Examiner*—Rina I Duda
(74) *Attorney, Agent, or Firm*—Drinker Biddle & Reath LLP

(57) ABSTRACT

A device for controlling a feed motion of a feed control axis and a rotary motion of a rotary control axis, both axes being provided in a machine tool so that the rotary control axis is fed along the feed control axis. The device includes an interference estimating section estimating an interference generated between the feed control axis and the rotary control axis, based on a position command instructed to at least one of the feed control axis and the rotary control axis and a position and mass information of an eccentric load carried by the rotary control axis; and a command correcting section correcting a current command given to at least one of the feed control axis and the rotary control axis, based on the interference estimated by the interference estimating section.

8 Claims, 9 Drawing Sheets

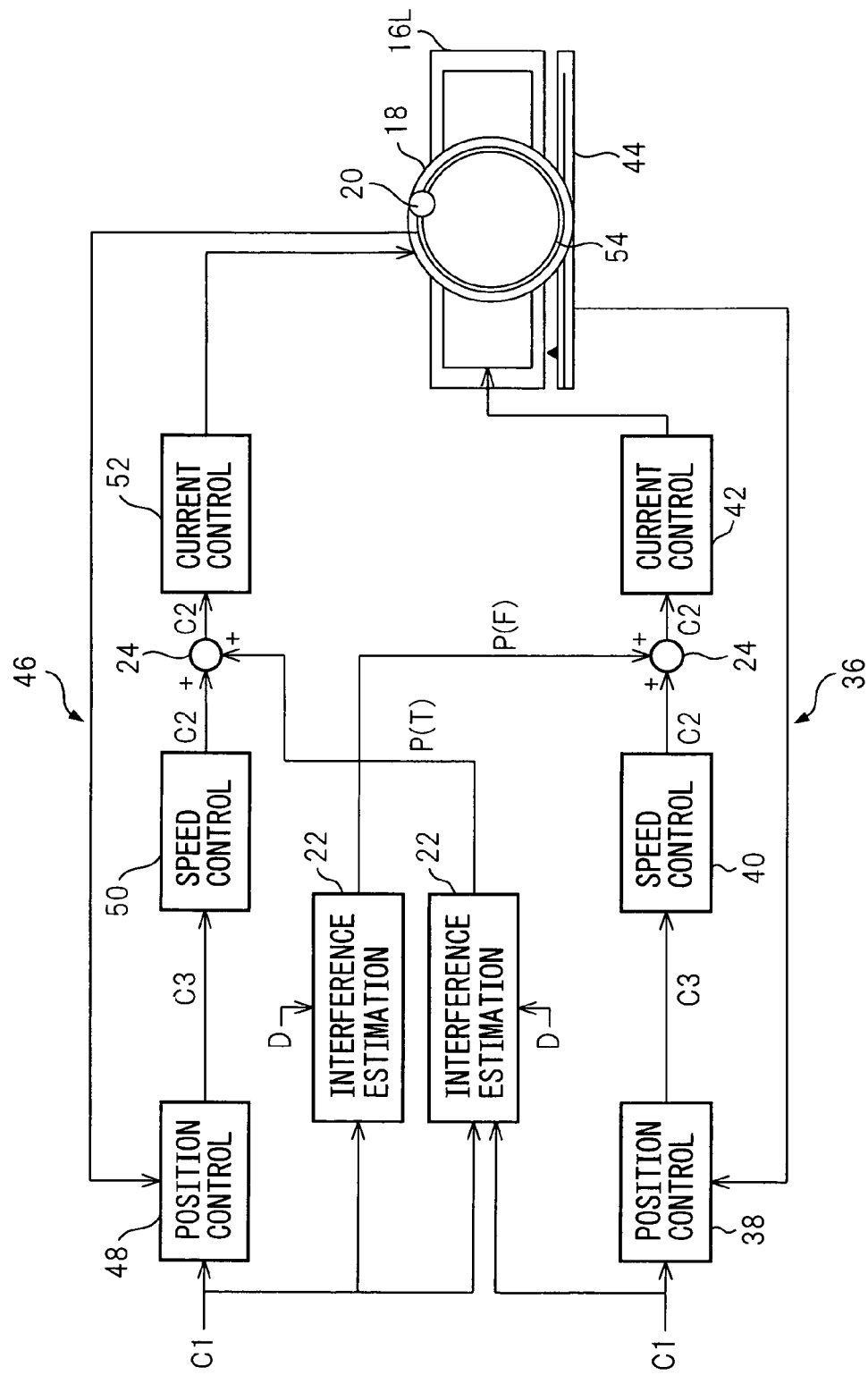

DEVICE AND METHOD FOR CONTROLLING MACHINE TOOL

BACKGROUND OF THE INVENTION

1. Field of the Invention

The present invention relates to control of a machine tool, and more particularly to device and method for controlling a feed control axis and a rotary control axis, both provided in a machine tool in which the rotary control axis is fed along the feed control axis.

2. Description of the Related Art

A machine tool provided with a feed control axis performing a linear or rotational feed motion and a rotary control axis adapted to be fed along the feed control axis and performing a rotary indexing motion has been known. The feed control axis carries a structural member such as a linear slide or a rotational slide, and the rotary control axis carries a structural member such as a rotary indexing table or a turret tool rest.

In the above machine tool, the feed control axis and the rotary control axis may exert a mechanical or dynamic effect (i.e., an interference) resulted from their respective motions on each other, which may affect the stability of position control of each axis and thus may result in the deterioration of the processing accuracy of a workpiece. Conventionally, in a technical field other than a machine tool, several measures for eliminating the interference between control axes structurally correlated with each other have been proposed.

For example, Japanese Unexamined Patent Publication (Kokai) No. 2000-243811 (JP-A-2000-243811) discloses a stage device incorporated into an exposure apparatus, which is configured to mechanically prevent vibration in an optical system caused due to a reaction force exerted by a slider on a stator, both provided in a linear motor for driving a stage. The stage device includes a reaction device that generates, in the stator, a force canceling the reaction force from the slider. The reaction device controls a motion of the stator based on a detection value of a position detector for detecting an actual displacement of the stator, so as to appropriately eliminate not only the reaction force, but also other error factors and thus to stably keep the stator located at a predetermined position.

Japanese Unexamined Patent Publication (Kokai) No. 63-314606 (JP-A-63-314606) discloses a controller provided in an articulated robot, which can eliminate an interference between joints (i.e., control axes) by a feedback compensation. The controller calculates an interference torque value generating in each control axis and estimates, by state observation means, nonlinear disturbance torque applied to each control axis as a correction value, and thereby corrects a torque command by using the interference torque value and the correction value.

Japanese Unexamined Patent Publication (Kokai) No. 09-222910 (JP-A-09-222910) discloses a controller provided in a multi-axis industrial robot in which each control axis is equipped with a spring element such as a decelerator. The controller estimates, by state observation means disposed in each axis, a twist angle between an electric motor and a load, calculates an interference force by using the estimated twist angle, and corrects a torque command given to the electric motor based on the interference force.

In the stage device disclosed in JP-A-2000-243811, the stator, that should naturally be immovably supported, is intentionally mounted on a motion control axis (i.e., the reaction device) for the purpose of canceling the reaction force exerted by the slider on the stator in the linear motor. Therefore, the relationship between a linear feed-control axis of the slider and the motion control axis of the stator is somewhat different from the relationship between the feed control axis and the rotary control axis in the above-described machine tool to which the invention of the present application belongs. Also, in the stage device, the position detector is used to measure the actual displacement of the stator for the purpose of eliminating various error factors in the motion control of the stator. However, in the case where such a position detector is installed in a machine tool, equipment costs of the machine tool may increase, and since the machine tool is often placed in poor environments, problems in ensuring installation space or maintaining reliability of the position detector may arise. Moreover, it is difficult to adapt a technique for correcting the command value given to the stator, on the basis of the actual value of the displacement of the stator, to a quick and accurate positioning control for a movable section in a typical machine tool.

Also, in the robot controllers disclosed in JP-A-63-314606 and JP-A-09-222910, data representing a state in which the electric motor actually operates (i.e., a state quantity) are used as several data required for calculating the interference force or correcting the command value. Such a configuration may be effective for controlling a robot, in which the moving speed or positional accuracy of an arm is lower than that of the movable section in the typical machine tools, but may also be difficult to be adapted to the control of the machine tool requiring the quick and accurate positioning.

SUMMARY OF THE INVENTION

It is an object of the present invention to provide a device for controlling a feed control axis and a rotary control axis, both provided in a machine tool in which the rotary control axis is fed along the feed control axis, wherein it is possible to quickly and appropriately eliminate interference between the feed control axis and the rotary control axis so as to implement stable and accurate motion control of the control axes, and thereby to improve a processing accuracy of a workpiece.

It is another object of the present invention to provide a method for controlling a feed control axis and a rotary control axis, both provided in a machine tool in which the rotary control axis is fed along the feed control axis, wherein it is possible to quickly and appropriately eliminate interference between the feed control axis and the rotary control axis so as to implement stable and accurate motion control of the control axes, and thereby to improve a processing accuracy of a workpiece.

To accomplish the above object, the present invention provides a device for controlling a feed motion of a feed control axis and a rotary motion of a rotary control axis, the feed control axis and the rotary control axis being provided in a machine tool so that the rotary control axis is fed along the feed control axis, comprising an interference estimating section estimating an interference generated between the feed control axis and the rotary control axis, based on a position command instructed to at least one of the feed control axis and the rotary control axis and a position and mass information of an eccentric load carried by the rotary control axis; and a command correcting section correcting a current command given to at least one of the feed control axis and the rotary control axis, based on the interference estimated by the interference estimating section.

The interference estimating section may estimate the interference prior to, by one or more control periods, a period of a motion control of at least one of the feed control axis and the rotary control axis executed in accordance with the position command; and the command correcting section may correct the current command at the period of the motion control.

The above controlling device may further comprise a constant changing section changing a calculation constant used by the interference estimating section to estimate the interference, in response to a change in the eccentric load.

The above controlling device may further comprise an eccentricity information estimating section estimating the position and mass information of the eccentric load, based on an interference-basis current command instructed to either one of the feed control axis or the rotary control axis in a state where the interference estimating section does not estimate the interference. In this arrangement, the interference estimating section may estimate the interference by using the position and mass information estimated by the eccentricity information estimating section.

The present invention also provides a method for controlling a feed motion of a feed control axis and a rotary motion of a rotary control axis, the feed control axis and the rotary control axis being provided in a machine tool so that the rotary control axis is fed along the feed control axis, comprising estimating an interference generated between the feed control axis and the rotary control axis, based on a position command instructed to at least one of the feed control axis and the rotary control axis and a position and mass information of an eccentric load carried by the rotary control axis; and correcting a current command given to at least one of the feed control axis and the rotary control axis, based on the interference thus estimated.

BRIEF DESCRIPTION OF THE DRAWINGS

The above and other objects, features and advantages of the present invention will become more apparent from the following description of preferred embodiments in connection with the accompanying drawings, wherein:

FIG. 4 is a block diagram showing a control flow in the controller of FIG. 1;

DETAILED DESCRIPTION

Figure 1:
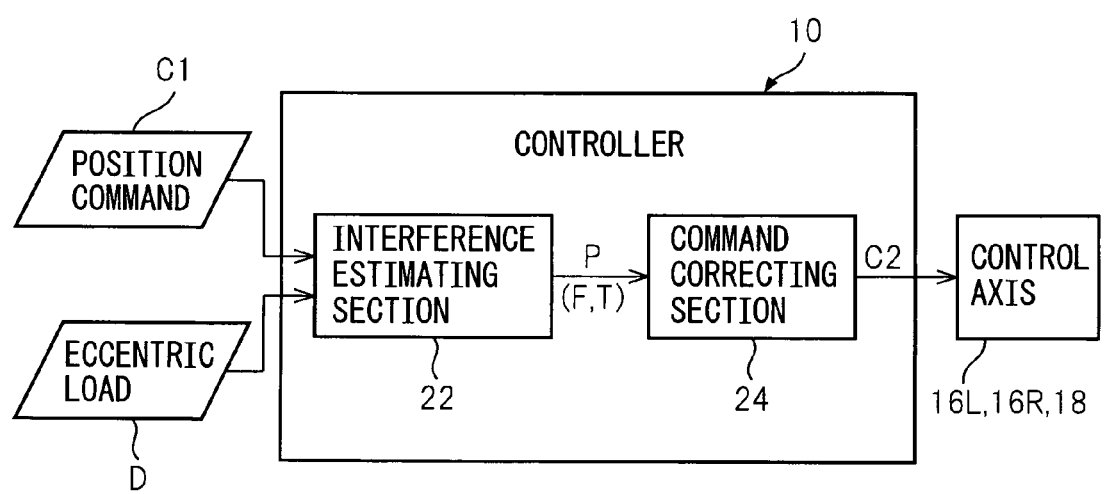
FIG. 1 is a functional block diagram showing a basic configuration of a controller according to the present invention.

The embodiments of the present invention are described below, in detail, with reference to the accompanying drawings. In the drawings, the same or similar components are denoted by common reference numerals.

Figure 2:
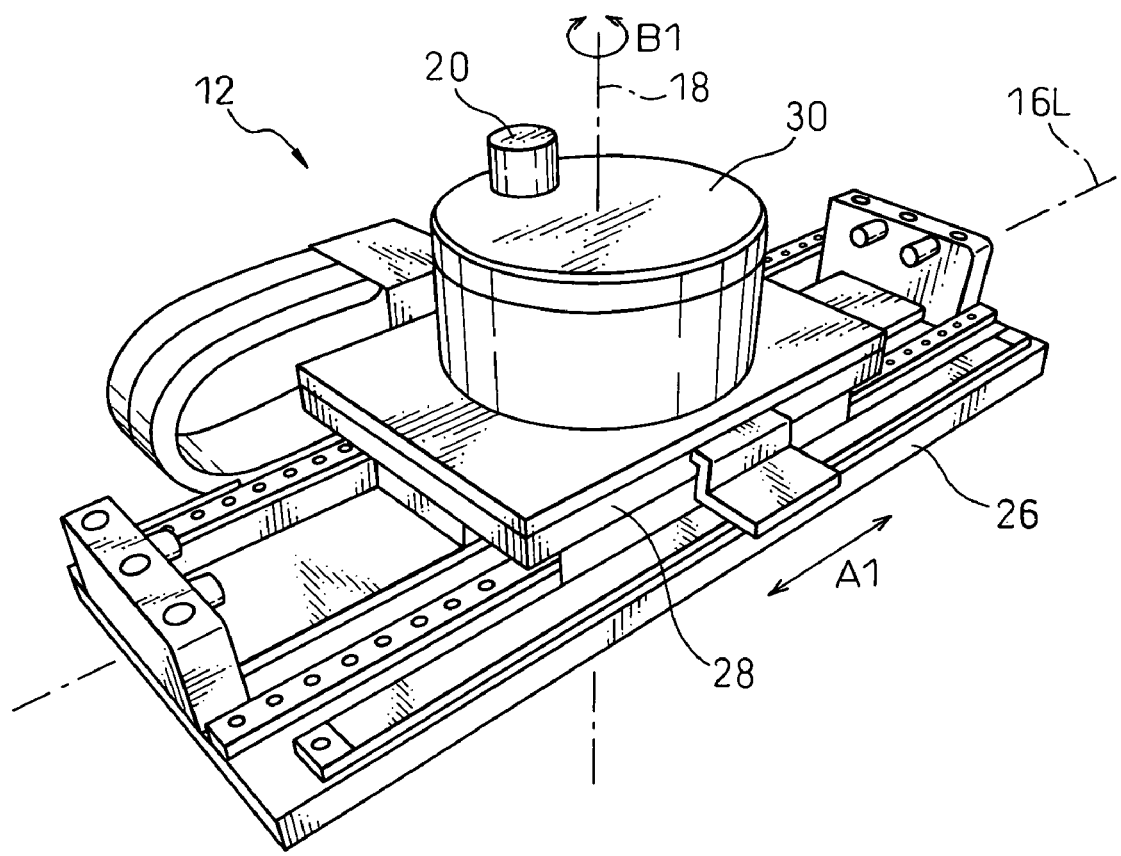
FIG. 2 is a perspective view schematically showing an example of a major part of a machine tool to which the controller of FIG. 1 can be applied.
Figure 3:
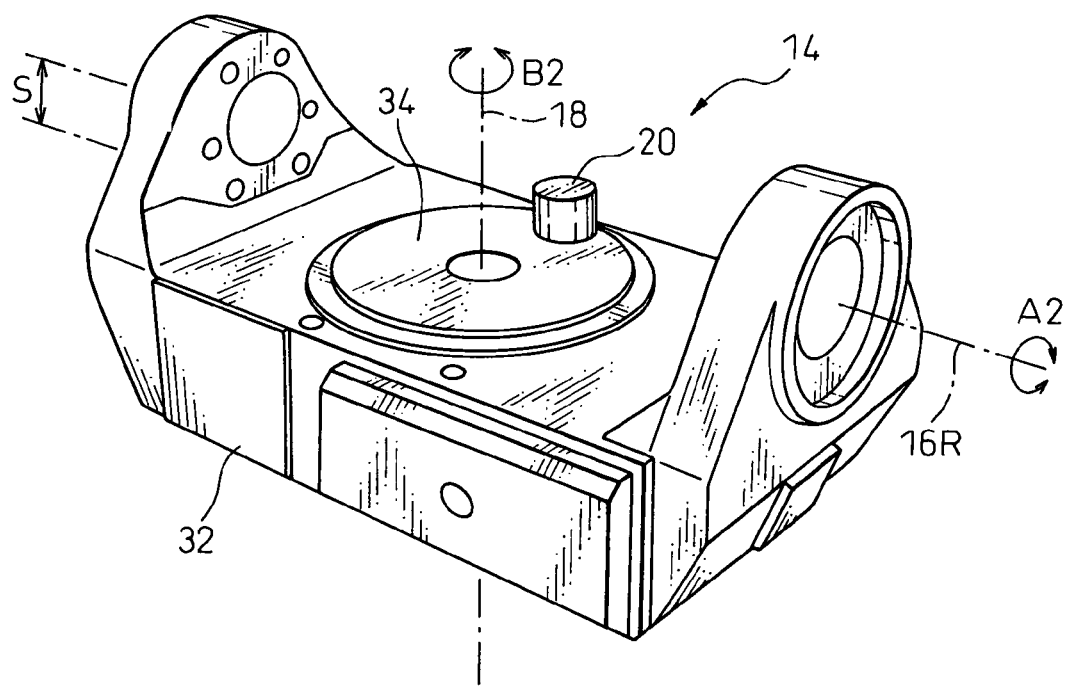
FIG. 3 is a perspective view schematically showing another example of a major part of a machine tool to which the controller of FIG. 1 can be applied.

Referring to the drawings, FIG. 1 shows, by a functional block diagram, a basic configuration of a controller (or a control device) 10 of an electric motor, according to the present invention. FIGS. 2 and 3 illustrate major parts of two representative examples of machine tools 12 and 14, respectively, to which the controller 10 can be applied. The machine tool 12, 14 is provided with a feed control axis 16L, 16R that performs a linear or rotational feed motion, and a rotary control axis 18 that is arranged on the feed control axis 16L, 16R so as to be fed along the feed control axes 16L, 16R and to perform a rotary indexing motion. The controller 10 has a configuration for controlling a feed motion of the feed control axis 16L, 16R and a rotary motion of the rotary control axis 18 in the machine tool 12, 14. The controller 10 may be functionally incorporated into an existing control unit, such as a numerical control (NC) unit, provided in the machine tool in which an electric motor is used as a drive source for a movable element.

As shown in FIG. 1, the controller 10 includes an interference estimating section 22 that estimates an interference P generated between the feed control axis 16L, 16R and the rotary control axis 18, based on a position command C1 that is instructed to at least one of the feed control axis 16L, 16R and the rotary control axis 18 (FIG. 2 or 3) and a position and mass information D of an eccentric load 20 (FIG. 2 or 3) carried by the rotary control axis 18; and a command correcting section 24 that corrects a current command C2 that is given to at least one of the feed control axis 16L, 16R and the rotary control axis 18, based on the interference P estimated by the interference estimating section 22. In the present application, the term "interference" means a dynamic effect that is mutually exerted between the feed control axis 16L, 16R and the rotary control axis 18 and resulted from their respective motions, and that includes both an interference thrust F acting in a linear direction and an interference torque T acting in a rotational direction, as described below.

The machine tool 12 illustrated in FIG. 2 includes, as a table mechanism on which a workpiece (not shown) is mounted, a stationary base 26, a linear slide 28 that is linearly movably placed on the stationary base 26, and a rotary indexing table 30 that is rotatably disposed on the linear slide 28. The linear slide 28 moves in a reciprocative manner on the stationary base 26 in a direction shown by an arrow A1, in accordance with the linear feed motion of the linear-feed control axis 16L that is provided with a linear electric motor (not shown) as a drive source. The rotary indexing table 30 rotates in a reciprocative manner on the linear slide 28 in a direction shown by an arrow B1, in accordance with the rotary indexing motion of the rotary control axis 18 that is provided with a rotary electric motor (not shown) as a drive source.

On the other hand, the machine tool 14 illustrated in FIG. 3 includes, as a table mechanism on which a workpiece (not shown) is mounted, a stationary base (not shown), a rotational slide 32 that is rotationally movably placed on the stationary base, and a rotary indexing table 34 that is rotatably disposed on the rotational slide 32. The rotational slide 32 moves in a reciprocative manner on the stationary base in a direction shown by an arrow A2, in accordance with the rotational feed motion of the rotational-feed control axis 16R that is provided with a rotary electric motor (not shown) as a drive source. The rotary indexing table 34 rotates in a reciprocative manner on the rotational slide 32 in a direction shown by an arrow B2, in accordance with the rotary indexing motion of the rotary control axis 18 that is provided with a rotary electric motor (not shown) as a drive source.

In the machine tool 12, 14 configured as described above, there may be a case where the rotary indexing table 30, 34 is provided with a center of gravity (i.e., the eccentric load 20) at a position deviated from the rotation center of the table, by an influence of a workpiece or a workpiece holder mounted on the table. In the case where the rotary control axis 18 carries such an eccentric load 20, an interference may occur between the linear or rotational slide 28, 32 and the rotary indexing table 30, 34. More specifically, when the linear or rotational slide 28, 32 operates in acceleration, a reaction against a thrust or torque of the slide may develop in the rotary indexing table 30, 34 provided with the eccentric load 20, so that the position of the rotary indexing table 30, 34 may be displaced from the commanded position. Similarly, when the rotary indexing table 30, 34 provided with the eccentric load 20 operates in acceleration, a reaction against a torque of the table may develop in the linear or rotational slide 28, 32, so that the position of the linear or rotational slide 28, 32 may be displaced from the commanded position. In either case, the processing accuracy of the workpiece may be deteriorated.

In order to address the above problem, the controller 10 according to the present invention has a configuration in which the interference estimating section 22 estimates the interference P on the basis of the position command C1 instructed to at least one of the feed control axis 16L, 16R and the rotary control axis 18 and the position and mass information D of the eccentric load 20 carried by the rotary control axis 18, and the command correcting section 24 corrects the current command C2 given to at least one of the feed control axis 16L, 16R and the rotary control axis 18 on the basis of the interference P thus estimated, so that the motions of the axes 16L, 16R and 18 can be controlled in high accuracy without being affected by the interference P. Therefore, a position detector for detecting an actual situation of interference is not needed, so that it is possible to inhibit increase in equipment costs of the machine tool 12, 14 and it is no longer required to is consider the installation space or reliability of the position detector. Moreover, the interference estimating section 22 estimates the interference P on the basis of the previously known data obtainable before starting the motion control, such as the position command C1 or the position and mass information D of the eccentric load 20, and the command correcting section 24 corrects, on the basis of the interference P, the current command C2 directly given to each axis 16L, 16R, 18, so that it is possible for the controller 10 to be adapted to a quick and accurate positioning control for the linear or rotational slide 28, 32 and the rotary indexing table 30, 34 in the machine tool 12, 14 without any problem. Thus, according to the controller 10, it is possible to quickly and appropriately eliminate the interference P between the feed control axis 16L, 16R and the rotary control axis 18 in the machine tool 12, 14 so as to implement the stable and accurate motion control of each control axis 16L, 16R, 18, and thereby to improve the processing accuracy of the workpiece.

In the configuration described above, the position command C1 and the position and mass information D of the eccentric load 20 may be manually input to the controller 10 by an operator, or alternatively, the controller 10 may read the position command C1 and the position and mass information D from a recording medium previously storing them. The controller 10 may also be provided with an input section and a storage section (not shown) for the position command C1 and the eccentric load information D.

Exemplary embodiments of a method for controlling respective axes of a machine tool, performed by the controller 10, will be described below with reference to FIGS. 4 to 8. In the following description, components corresponding to those shown in FIGS. 1 to 3 are denoted by like reference numerals, and the explanation thereof is not repeated.

First, a method for controlling the motion of the feed control axis 16L and the rotary control axis 18, both provided in the machine tool 12 shown in FIG. 2, will be described. As shown in FIG. 4, the controller 10 has a typical control loop 36 for the feed control axis 16L, in which a position control section 38 arithmetically processes the position command C1 input for the feed control axis 16L (or the linear motor) so as to output a speed command C3, a speed control section 40 arithmetically processes the speed command C3 so as to output the current (or thrust) command C2, a current control section 42 instructs a current value corresponding to the current command C2 to the feed control axis 16L, and a position detector 44, such as an encoder, additionally provided to the feed control axis 16L detects an actual operating position of the feed control axis 16L and feeds it back to the position control section 38. The controller 10 also has a typical control loop 46 for the rotary control axis 18, in which a position control section 48 arithmetically processes the position command C1 input for the rotary control axis 18 (or the rotary motor) so as to output a speed command C3, a speed control section 50 arithmetically processes the speed command C3 so as to output the current (or torque) command C2, a current control section 52 instructs a current value corresponding to the current command C2 to the rotary control axis 18, and a position detector 54, such as an encoder, additionally provided to the rotary control axis 18 detects an actual operating position of the rotary control axis 18 and feeds it back to the position control section 48.

In the above-described configuration of control, at the time when the rotary control axis 18 performs a rotary indexing motion on the halting or operating feed control axis 16L, the interference estimating section 22 estimates the interference P (i.e., the interference thrust F) exerted by the rotary control axis 18 on the feed control axis 16L, based on the position command C1 instructed to the rotary control axis 18 and the position and mass information D of the eccentric load 20 carried by the rotary control axis 18. Then, the command correcting section 24 corrects the current command C2 by adding the interference P (or the interference thrust F) estimated by the interference estimating section 22 to the current command C2 output from the speed control section 40 in the control loop 36 for the feed control axis 16L. As a result, the current control section 42 appropriately instructs a current value corresponding to the current command C2 corrected by the command correcting section 24 to the feed control axis 16L.

On the other hand, in the above-described configuration of control, at the time when the feed control axis 16L performs a linear feed motion relative to the halting or operating rotary control axis 18, the interference estimating section 22 estimates the interference P (i.e., the interference torque T) exerted by the feed control axis 16L on the rotary control axis 18, based on the respective commands C1 instructed to both the feed control axis 16L and the rotary control axis 18 and the position and mass information D of the eccentric load 20 carried by the rotary control axis 18. Then, the command correcting section 24 corrects the current command C2 by adding the interference P (or the interference torque T) estimated by the interference estimating section 22 to the current command C2 output from the speed control section 50 in the control loop 46 for the rotary control axis 18. As a result, the current control section 52 appropriately instructs a current value corresponding to the current command C2 corrected by the command correcting section 24 to the rotary control axis 18.

A process for estimating the interference P, performed by the interference estimating section 22 in the above-described control flow, will be described below with reference to FIGS. 5A to 6B. FIGS. 5A to 6B diagrammatically show a mechanical or dynamic relationship between the feed control axis 16L and the rotary control axis 18, with the eccentric load 20 being considered as a material point.

Figure 5A:
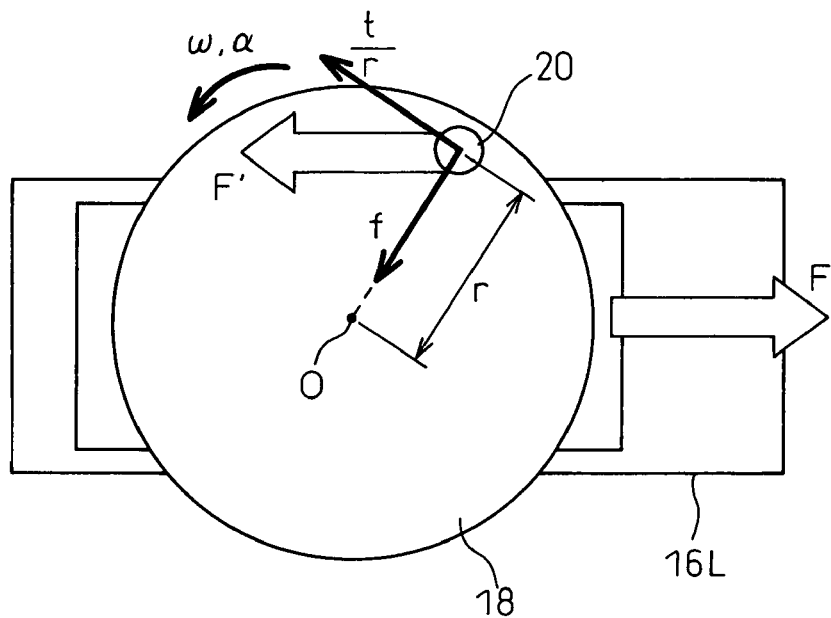
FIG. 5A is an illustration for explaining a procedure for estimating an interference in relation to the machine tool of FIG. 2, and typically shows a dynamic relationship between a feed control axis and a rotary control axis.
Figure 5B:
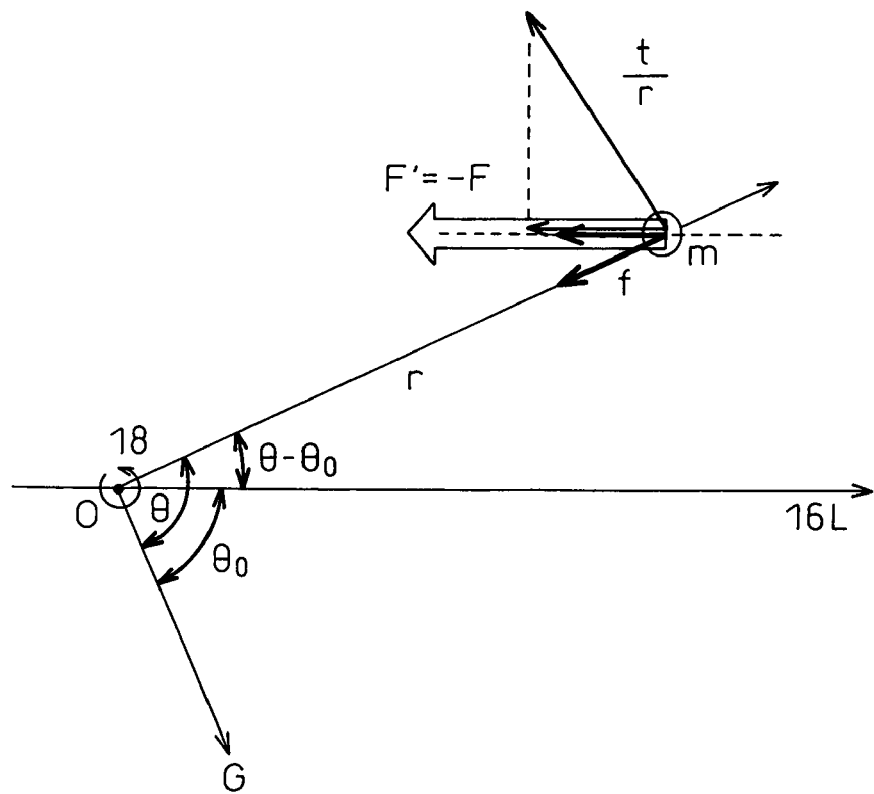
FIG. 5B is an illustration for explaining the procedure for estimating the interference in relation to the machine tool of FIG. 2, and geometrically shows the dynamic relationship between the feed control axis and the rotary control axis with an eccentric load being considered as a material point.

FIGS. 5A and 5B show a state in which the rotary control axis 18 performs the rotary indexing motion on the halting or operating feed control axis 16L (especially, in an accelerating state at an angular acceleration α). During the rotary indexing motion, a centripetal force "f" caused correspondingly to an angular velocity ω and a torque "t" (more accurately, a tangential force t/r) caused correspondingly to the angular acceleration α are applied to the eccentric load 20 (FIG. 5A). With the distance between the rotation center O of the rotary control axis 18 and the eccentric load 20 being defined as "r", and the mass of the eccentric load 20 being defined as "m", the following equations are obtained:

$$f = m \cdot r \cdot \omega^2$$

$$t/r = m \cdot r \cdot \alpha = m \cdot r \cdot d\omega/dt$$

Consideration about a force exerted by the centripetal force f and the tangential force t/r on the feed control axis 16L (i.e., the interference thrust F) will be given below. With the rotation angle of the eccentric load 20 from a machine coordinate origin G of the rotary control axis 18 is defined as θ, and the angle (or position) of the feed control axis 16L (i.e., a linear feeding direction) from the machine coordinate origin G is defined as $\theta_0$, a resultant force F' (FIG. 5B) obtained from the centripetal force f and the tangential force t/r in a direction parallel to the feed control axis 16L, which is applied to the eccentric load 20 during the rotary indexing motion, is expressed by the following equation:

$$F' = m \cdot r \cdot \omega^2 \cdot \cos(\theta - \theta_0) + m \cdot r \cdot d\omega/dt \cdot \sin(\theta - \theta_0)$$

Thus, the interference thrust F (or the interference P) exerted by the rotary control axis 18 on the feed control axis 16L is estimated as F=−F'. In the above explanation, "r" and "m" can be acquired as the position and mass information D of the eccentric load 20, and θ can be acquired as the position command C1 instructed to the rotary control axis 18. Further, $\theta_0$ is a value inherent in the machine tool 12, and represents a relative positional relationship between the feed control axis 16L and the rotary control axis 18.

Figure 6A:
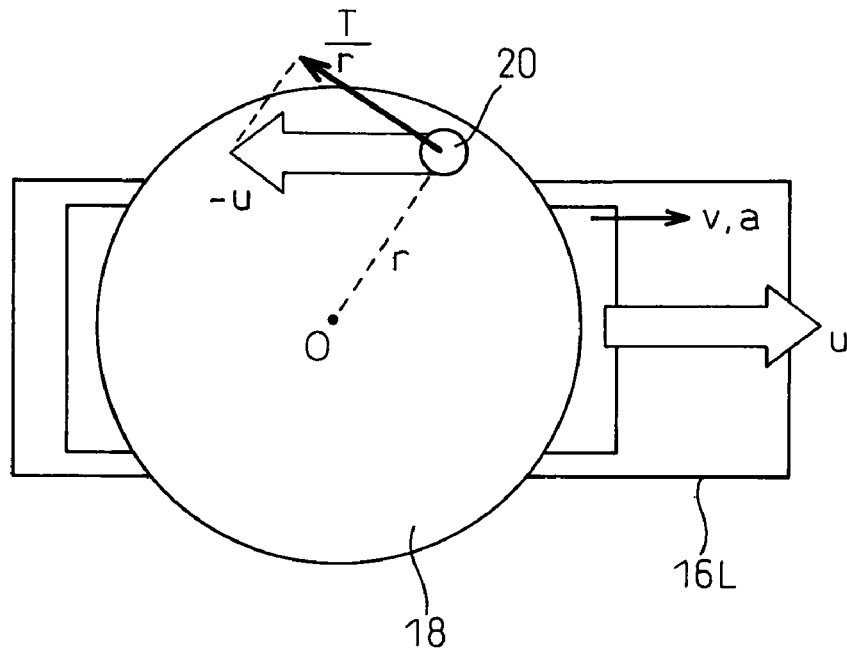
FIG. 6A is an illustration for explaining a procedure for estimating another interference in relation to the machine tool of FIG. 2, and typically shows a dynamic relationship between a feed control axis and a rotary control axis.
Figure 6B:
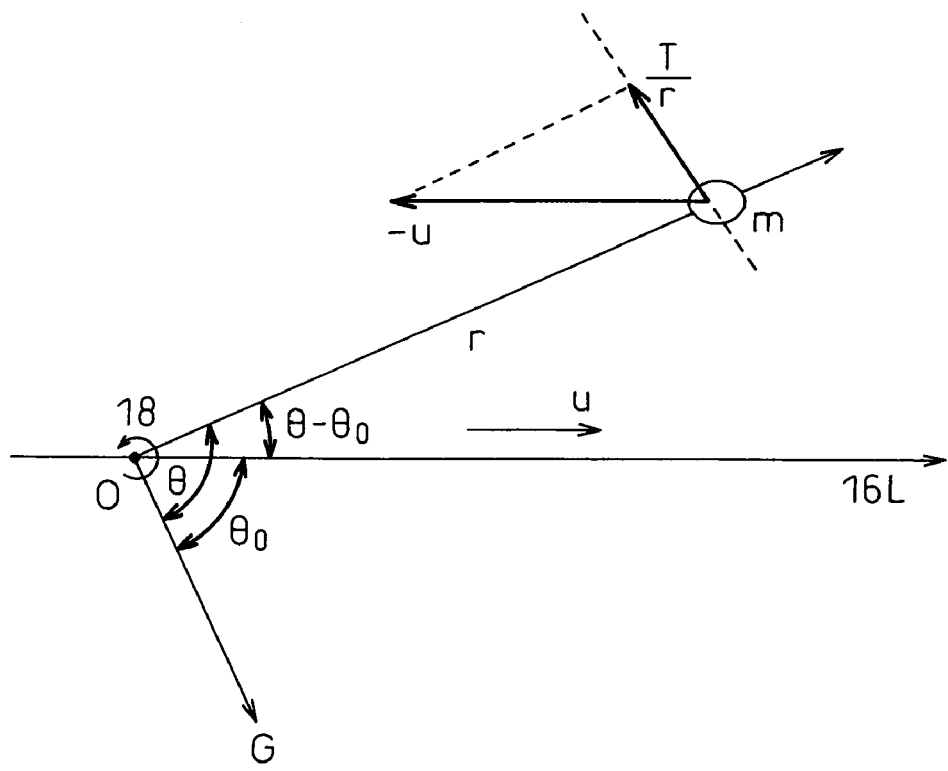
FIG. 6B is an illustration for explaining the procedure for estimating the other interference in relation to the machine tool of FIG. 2, and geometrically shows the dynamic relationship between the feed control axis and the rotary control axis with an eccentric load being considered as a material point.

On the other hand, FIGS. 6A and 6B show a state in which the feed control axis 16L performs the linear feed motion relative to the halting or operating rotary control axis 18 (especially, in an accelerating state at an acceleration "a").

During the linear feed motion, the following thrust "u" caused correspondingly to the acceleration "a" is applied to the eccentric load 20 (FIG. 6A):

$$u = m \cdot a = m \cdot dv/dt$$

Then, a force exerted by the thrust "u" on the rotary control axis 18 (i.e., the interference torque T) is expressed by the following equation:

$$T = -u \cdot r \cdot \sin(\theta - \theta_0) = -m \cdot r \cdot dv/dt \cdot \sin(\theta - \theta_0)$$

Thus, the interference torque T (or the interference P) exerted by the feed control axis 16L on the rotary control axis 18 is estimated. In the above explanation, "r" and "m" can be acquired as the position and mass information D of the eccentric load 20, θ can be acquired as the position command C1 instructed to the rotary control axis 18, and "a" (or "v") can be acquired from the position command C1 instructed to the feed control axis 16L. Further, $\theta_0$ is a value inherent in the machine tool 12, and represents a relative positional relationship between the feed control axis 16L and the rotary control axis 18.

Figure 7:
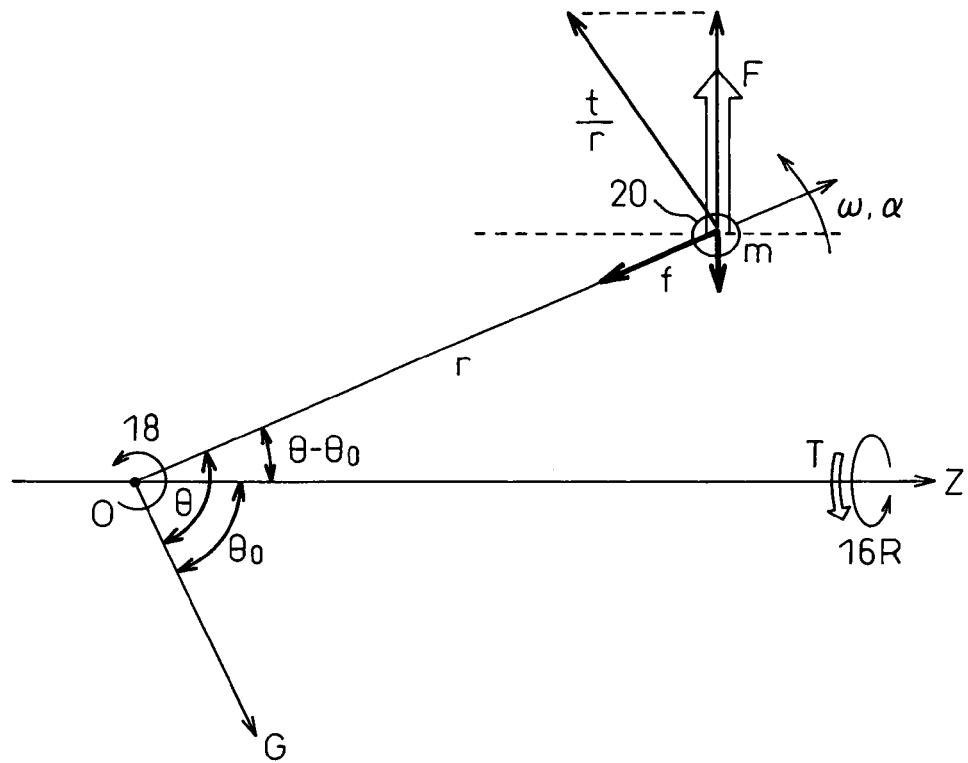
FIG. 7 is an illustration for explaining a procedure for estimating an interference in relation to the machine tool of FIG. 3.
Figure 8:
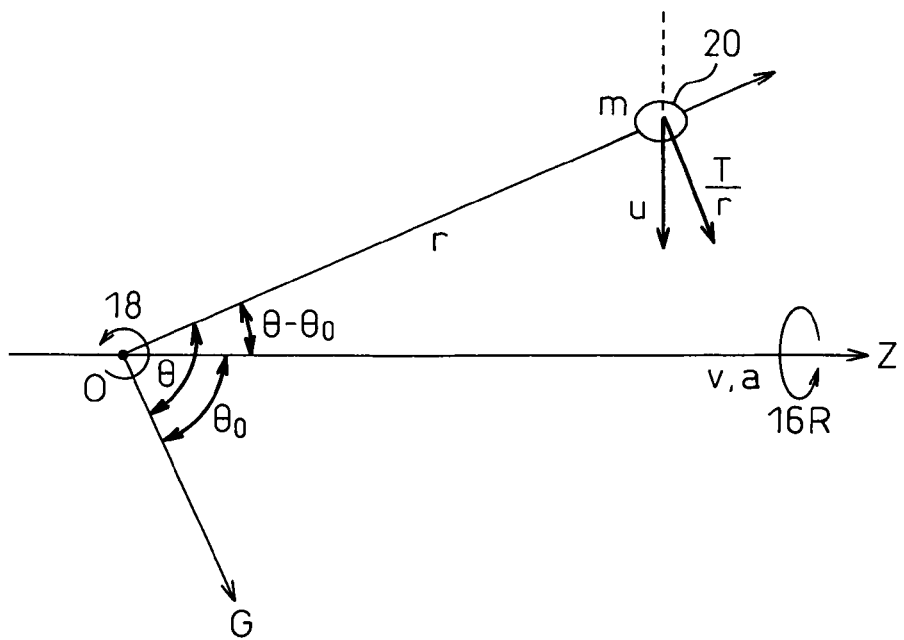
FIG. 8 is an illustration for explaining a procedure for estimating another interference in relation to the machine tool of FIG. 3.

Next, a method for controlling the motion of the feed control axis 16R and the rotary control axis 18, both provided in the machine tool 14 shown in FIG. 3, will be described. This motion control method is similar to the above-described method for controlling the motion of the feed control axis 16L and the rotary control axis 18 in the machine tool 12, and therefore, the explanation of the control flow is not repeated, and a process for estimating the interference P, performed by the interference estimating section 22, will be described below with reference to FIGS. 7 and 8. FIGS. 7 and 8 diagrammatically show a mechanical or dynamic relationship between the feed control axis 16R and the rotary control axis 18, with the eccentric load 20 being considered as a material point.

FIG. 7 shows a state in which the rotary control axis 18 performs the rotary indexing motion on the halting or operating feed control axis 16R (especially, in an accelerating state at an angular acceleration α). In this connection, it is assumed that the actual feed control axis 16R has a rotation center axis parallel to a reference axis Z as illustrated, the center axis being located at a position spaced from the reference axis Z by a distance "s" (FIG. 3) in a direction orthogonal to the plane of the drawing. During the rotary indexing motion of the rotary control axis 18, a centripetal force "f" caused correspondingly to an angular velocity ω and a torque "t" (more accurately, a tangential force t/r) caused correspondingly to the angular acceleration α are applied to the eccentric load 20. With the distance between the rotation center O of the rotary control axis 18 and the eccentric load 20 being defined as "r", and the mass of the eccentric load 20 being defined as "m", the following equations are obtained:

$$f = m \cdot r \cdot \omega^2$$

$$t/r = m \cdot r \cdot \alpha = m \cdot r \cdot d\omega/dt$$

Consideration about a force exerted by the centripetal force f and the tangential force t/r on the feed control axis 16R (i.e., the interference torque T) will be given below. With the rotation angle of the eccentric load 20 from a machine coordinate origin G of the rotary control axis 18 is defined as θ, and the angle (or position) of the reference axis Z (parallel to the feed control axis 16R) from the machine coordinate origin G is defined as $\theta_0$, a resultant force F obtained from the centripetal force f and the tangential force t/r in a direction orthogonal to the reference axis Z, which is applied to the eccentric load 20 during the rotary indexing motion, is expressed by the following equation:

$$F = m \cdot r \cdot \omega^2 \cdot \sin(\theta-\theta_0) - m \cdot r \cdot d\omega/dt \cdot \cos(\theta-\theta_0)$$

Thus, the interference torque T (or the interference P) exerted by the rotary control axis 18 on the feed control axis 16R is estimated as T=−F·s. In the above description, "r", "m" and "s" can be acquired as the position and mass information D of the eccentric load 20, and θ can be acquired as the position command C1 instructed to the rotary control axis 18. Further, $\theta_0$ is a value inherent in the machine tool 14, and represents a relative positional relationship between the feed control axis 16R and the rotary control axis 18.

On the other hand, FIG. 8 shows a state in which the feed control axis 16R performs the rotational feed motion relative to the halting or operating rotary control axis 18 (especially, in an accelerating state at a tangential acceleration "a"). During the rotational feed motion, the following thrust "u" caused correspondingly to the tangential acceleration "a" is applied to the eccentric load 20:

$$u = m \cdot a = m \cdot dv/dt$$

Then, a force exerted by the thrust "u" on the rotary control axis 18 (i.e., the interference torque T) is expressed by the following equation:

$$T = -u \cdot r \cdot \cos(\theta-\theta_0) = -m \cdot r \cdot dv/dt \cdot \cos(\theta-\theta_0)$$

Thus, the interference torque T (or the interference P) exerted by the feed control axis 16R on the rotary control axis 18 is estimated. In the above explanation, "r" and "m" (and the distance "s" for converting the angular displacement to the linear displacement) can be acquired as the position and mass information D of the eccentric load 20, θ can be acquired as the position command C1 instructed to the rotary control axis 18, and "a" (or "v") can be acquired from the position command C1 instructed to the feed control axis 16R. Further, $\theta_0$ is the value inherent in the machine tool 14, and represents a relative positional relationship between the feed control axis 16R and the rotary control axis 18.

As described above, the controller 10 is configured such that the interference estimating section 22 estimates the interference P on the basis of the previously known data that can be acquired before starting the motion control and the command correcting section 24 corrects the current command C2 on the basis of the interference P, so that it is possible for the controller 10 to be adapted to the quick and accurate positioning control in the machine tool 12, 14. Therefore, when the controller 10 is configured so that the interference estimating section 22 estimates the interference P prior to, by one or more control periods, a certain period of a motion control of at least one of the feed control axis 16L, 16R and the rotary control axis 18 executed in accordance with the position command C1, and the command correcting section 24 corrects the current command C2 at the period of the motion control, the controller 10 can be adapted more reliably to the quick and accurate positioning control.

In general, a rotary control axis of a machine tool carries an object, such as a workpiece, a tool, etc., a load of which widely changes in magnitude or location, so that it is difficult to perform an accurate correction in response to the change in the load even when an interference between control axes is determined by calculation as in the present invention, if a constant term, such as a mass, position, angle, etc., in the equation used for the calculation remain fixed. Accordingly, it is advantageous that the controller 10 having the above-described basic configuration additionally possesses a function for changing a calculation constant used by the interference estimating section 22 to estimate the interference P, in response to a change in the eccentric load 20.

Figure 9:
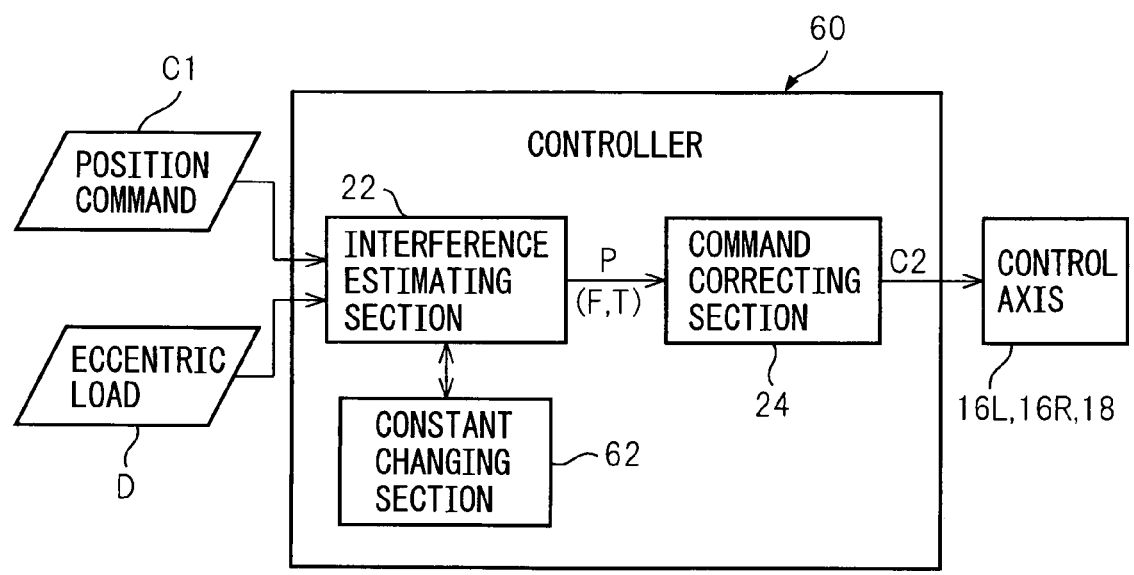
FIG. 9 is a functional block diagram showing a configuration of a controller according to an embodiment of the present invention.

FIG. 9 shows, by a functional block diagram, a configuration of a controller 60 having the additional function described above and according to a preferred embodiment of the present invention. The controller 60 includes, in addition to the basic configuration of the controller 10 of FIG. 1, a constant changing section 62 that changes a calculation constant (m, r, $\theta_0$, etc.) used by the interference estimating section 22 to estimate the interference P, in response to a change in the eccentric load 20. Thus, components corresponding to those of the controller 10 are denoted by like reference numerals, and the explanation thereof is not repeated.

For example, in the embodiment shown in FIGS. 5A and 5B, during the time when the rotary control axis 18 rotates at a constant speed, the interference thrust F exerted on the feed control axis 16L is expressed by the equation: $F = -m \cdot r \cdot \omega^2 \cdot \cos(\theta-\theta_0)$, which is illustrated in a sinusoidal curve. Therefore, if the eccentric load 20 is changed, a test operation in which the rotary control axis 18 rotates at a constant speed on the halting feed control axis 16L (which should be a lower speed to the extent that the positional deviation of the feed control axis 16L does not become too large) is performed, so that, in the normal feedback loop for the feed control axis 16L (see FIG. 4) in the controller 60, the speed control section 40 is made output a current command C2 showing a sinusoidal curve similar to the interference thrust F and canceling the latter (referred to as an interference-basis current command, in the present application), in a state where the interference estimating section 22 does not yet estimate the interference.

Then, the constant changing section 62 can determine the value of the calculation constant (m, r, $\theta_0$, etc.) as changed, by observing the interference-basis current command C2 output from the speed control section 40 (i.e., the current command C2 that has not been corrected by the command correcting section 24). More specifically, at the time when the current command C2 exhibits its maximum value C2max, which means $\cos(\theta-\theta_0)=1$, the following equation is obtained: $m \cdot r = K \cdot C2max/\omega^2$ (where K is a torque constant inherent in the electric motor). Therefore, as a result of the test operation, the constant changing section 62 can determine the mass "m" and position "r" of the eccentric load 20 which has been changed, on the basis of the maximum value C2max of the current command C2 and the angular velocity ω of the rotary control axis 18. Also, the constant changing section 62 can determine the angle $\theta_0$ of the feed control axis 16L relative to the machine coordinate origin G (FIG. 5B) (i.e., the relative positional relationship between the rotary control axis 18 and the feed control axis 16L), on the basis of the rotation angle θ of the rotary control axis 18 at the time when the current command C2 exhibits the maximum value C2max or the minimum value 0 (zero).

If it is difficult in the above test operation to rotate the rotary control axis 18 by one or more turns (or at least 360 degrees), the maximum value C2max of the current command C2 cannot be specified, but in this case, it is advisable to previously measure only the angle $\theta_0$ of the feed control axis 16L relative to the machine coordinate origin G. Then, the mass "m" and position "r" of the eccentric load 20 can be determined by observing both the current command C2 and the angle $(\theta-\theta_0)$ in the test operation.

Similarly, in the embodiment shown in FIG. 7, during the time when the rotary control axis 18 rotates at a constant speed, the interference torque T exerted on the feed control axis 16R is expressed by the equation: $T = -s \cdot m \cdot r \cdot \omega^2 \cdot \sin(\theta-$ $\theta_0$). Therefore, in a way similar to the above-described procedure, when the eccentric load 20 is changed, the constant changing section 62 performs a test operation in which the rotary control axis 18 rotates at a constant speed on the halting feed control axis 16R, and thereby can determine the mass "m" and position "r" of the eccentric load 20 which has been changed, as well as the relative positional relationship "s" and angle $\theta_0$ between the rotary control axis 18 and the feed control axis 16R, on the basis of the maximum value C2max of the current command C2 and the angular velocity $\omega$ and rotation angle $\theta$ of the rotary control axis 18.

According to the controller 60 configured as described above, in addition to the already-described particular effects obtained by the controller 10, for the machine tool 12, 14 including the rotary control axis 18 carrying an object, such as a workpiece, a tool, etc., a load of which widely changes in magnitude or location, it is advantageously possible to accurately eliminate the interference between the rotary control axis and the feed control axis, in appropriately response to the change in the load.

In the controller 10, 60 described above, it is explained that the position and mass information D of the eccentric load 20, initially given to the interference estimating section 22, is a previously known data that can be acquired before starting the motion control. In this case, normally used as the position "r" and mass "m" of the eccentric load 20 are actually measured values, and therefore, a preparation work for the motion control may tend to be cumbersome. On the other hand, if the above-described function of the constant changing section 62 of the controller 60 is used, it is possible to suitably estimate the position and mass information D of the eccentric load 20 initially given to the interference estimating section 22 without using the actual measurement.

Figure 10:
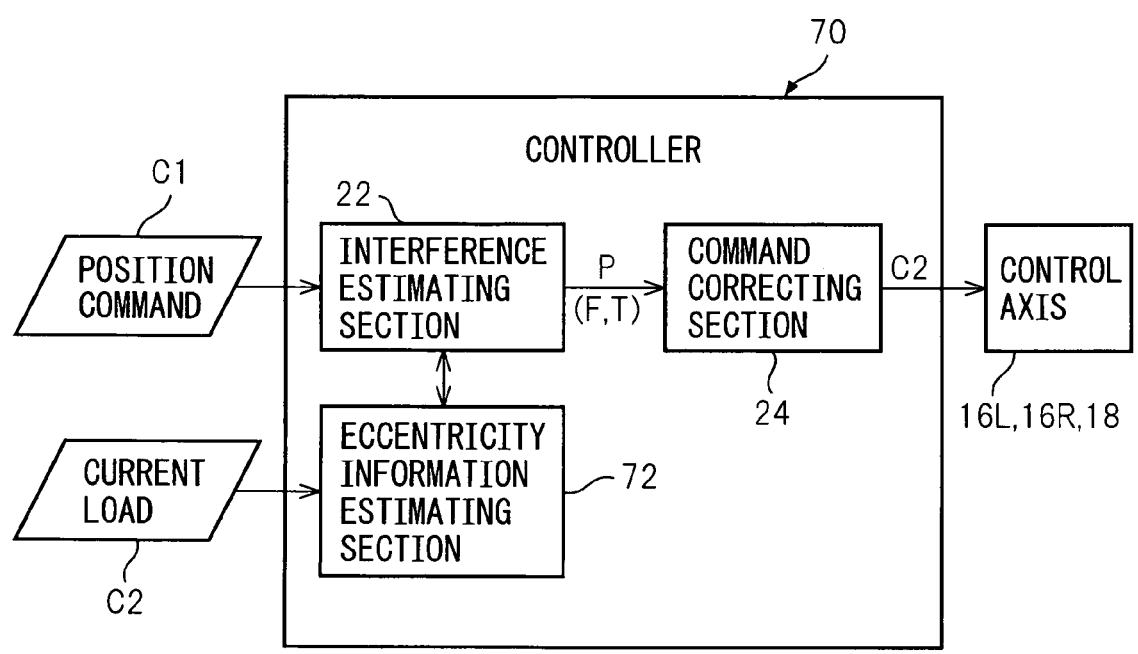
FIG. 10 is a functional block diagram showing a configuration of a controller according to another embodiment of the present invention.

FIG. 10 shows, by a functional block diagram, a configuration of a controller 70 having the additional function described above and according to another preferred embodiment of the present invention. The controller 70 includes, in addition to the basic configuration of the controller 10 of FIG. 1, an eccentricity information estimating section 72 that estimates the position and mass information D of the eccentric load 20. Thus, components corresponding to those of the controller 10 are denoted by like reference numerals, and the explanation thereof is not repeated.

A procedure for estimating the eccentricity information by the eccentricity information estimating section 72 is substantially the same as the above-described procedure for changing the constant by the constant changing section 62 of the controller 60. More specifically, for example, in the embodiment shown in FIGS. 5A and 5B, in the case where the position and mass information D of the eccentric load 20 is unknown, the above-described test operation in which the rotary control axis 18 rotates at a constant speed on the halting feed control axis 16L is performed, so that, in the normal feedback loop for the feed control axis 16L (see FIG. 4) in the controller 70, the speed control section 40 is made output an interference-basis current command C2 in a state where the interference estimating section 22 does not yet estimate the interference.

Then, the eccentricity information estimating section 72 estimates the position and mass information D (i.e., position "r" and mass "m") of the eccentric load 20, on the basis of the interference-basis current command C2 instructed to the feed control axis 16L (i.e., the current command C2 that has not been corrected by the command correcting section 24). More specifically, in the equation expressing the interference thrust F exerted on the feed control axis 16L during the time when the rotary control axis 18 rotates at a constant speed $\omega$, i.e., $F=-m \cdot r \cdot \omega^2 \cdot \cos(\theta-\theta_0)$, at the time when the current command C2 exhibits its maximum value C2max, which means $\cos(\theta-\theta_0)=1$, the following equation is obtained: $m \cdot r = K \cdot C2max/\omega^2$ (where K is a torque constant inherent in the electric motor). Therefore, the eccentricity information estimating section 72 can determine the mass "m" and the position "r" of the eccentric load 20, on the basis of the maximum value C2max of the current command C2 and the angular velocity $\omega$ of the rotary control axis 18. Also, the eccentricity information estimating section 72 can determine the angle $\theta_0$ of the feed control axis 16L relative to the machine coordinate origin G (FIG. 5B) (i.e., the relative positional relationship between the rotary control axis 18 and the feed control axis 16L), on the basis of the rotation angle $\theta$ of the rotary control axis 18 at the time when the current command C2 exhibits the maximum value C2max or the minimum value 0 (zero). The position and mass information D (i.e., position "r" and mass "m") of the eccentric load 20 and the angle $\theta_0$ thus estimated are stored, for example, in a storage section (not shown) of the controller 70, and used when the interference estimating section 22 estimates the interference thrust F in an actual motion control.

The eccentricity information estimating section 72 can also estimate the position and mass information D of the eccentric load 20, by performing a test operation in which the feed control axis 16L performs the feed motion at a constant acceleration relative to the halting rotary control axis 18. As a result of this test operation, in the normal feedback loop for the rotary control axis 18 (see FIG. 4) in the controller 70, the speed control section 50 outputs an interference-basis current command C2 in a state where the interference estimating section 22 does not yet estimate the interference. In this connection, as already described with reference to FIGS. 6A and 6B, the interference torque T exerted by the thrust "u" on the rotary control axis 18 is expressed by the equation: $T=-m \cdot r \cdot dv/dt \cdot \sin(\theta-\theta_0)$, and therefore, the rotation angle $\theta$ of the rotary control axis 18 at the time when the current command C2 exhibits the minimum value 0 (zero) is the angle $\theta_0$ of the feed control axis 16L relative to the machine coordinate origin G (FIG. 6B). Then, the eccentricity information estimating section 72 can determine the mass "m" and the position "r" of the eccentric load 10 by using the equation for the interference torque T, on the basis of the current command C2 observed at the time when the feed control axis 16L performs the feed motion at a constant acceleration $dv/dt$ with the rotary control axis 18 halting at an arbitrary angle $\theta$.

According to the controller 70 configured as described above, in addition to the already-described particular effects obtained by the controller 10, it is advantageously possible to omit a measuring work of the position and mass information D of the eccentric load 20 and thus to simplify the preparation work for the motion control.

As will be understood from the above description, according to the invention, any position detector for detecting an actual situation of interference is no longer needed, so that it is possible to inhibit increase in equipment costs of a machine tool and it is no longer required to consider the installation space or reliability of a position detector. Moreover, the interference estimating section estimates the interference on the basis of the previously known data obtainable before starting the motion control, such as the position command instructed to at least one of the feed control axis and the rotary control axis or the position and mass information of the eccentric load, and the command correcting section corrects, on the basis of the interference, the current command directly given to each axis, so that it is possible for the controller to be adapted to a quick and accurate positioning control required in the machine tool without any problem. Thus, according to the controller, it is possible to quickly and appropriately eliminate the interference between the feed control axis and the rotary control axis in the machine tool so as to implement the stable and accurate motion control of each control axis, and thereby to improve the processing accuracy of the workpiece.

While the invention has been described with reference to specific preferred embodiments, it will be understood, by those skilled in the art, that various changes and modifications may be made thereto without departing from the scope of the following claims.

the invention claimed is:

1. A device for controlling a feed motion of a feed control axis and a rotary motion of a rotary control axis, said feed control axis and said rotary control axis being provided in a machine tool so that said rotary control axis is fed along said feed control axis, comprising:

an interference estimating section estimating an interference generated between said feed control axis and said rotary control axis, based on a position command instructed to at least one of said feed control axis and said rotary control axis and a position and mass information of an eccentric load carried by said rotary control axis, by calculating a force exerted on said rotary control axis due to a thrust applied to said eccentric load during the feed motion of said feed control axis, or by calculating a force exerted on said feed control axis due to a centripetal force and a tangential force applied to said eccentric load during the rotary motion of said rotary control axis; and a command correcting section correcting a current command given to at least one of said feed control axis and said rotary control axis, based on said interference estimated by said interference estimating section.

2. A device as set forth in claim 1, wherein said interference estimating section estimates said interference prior to, by one or more control periods, a period of a motion control of at least one of said feed control axis and said rotary control axis executed in accordance with said position command; and wherein said command correcting section corrects said current command at said period of said motion control.

3. A device as set forth in claim 1, further comprising a constant changing section changing a calculation constant used by said interference estimating section to estimate said interference, in response to a change in said eccentric load.

4. A device as set forth in claim 1, further comprising an eccentricity information estimating section estimating said position and mass information of said eccentric load, based on an interference-basis current command instructed to either one of said feed control axis or said rotary control axis in a state where said interference estimating section does not estimate said interference; wherein said interference estimating section estimates said interference by using said position and mass information estimated by said eccentricity information estimating section.

5. A method for controlling a feed motion of a feed control axis and a rotary motion of a rotary control axis, said feed control axis and said rotary control axis being provided in a machine tool so that said rotary control axis is fed along said feed control axis, comprising:

estimating an interference generated between said feed control axis and said rotary control axis, based on a position command instructed to at least one of said feed control axis and said rotary control axis and a position and mass information of an eccentric load carried by said rotary control axis, by calculating a force exerted on said rotary control axis due to a thrust applied to said eccentric load during the feed motion of said feed control axis, or by calculating a force exerted on said feed control axis due to a centripetal force and a tangential force applied to said eccentric load during the rotary motion of said rotary control axis; and correcting a current command given to at least one of said feed control axis and said rotary control axis, based on said interference thus estimated.

6. A method as set forth in claim 5, wherein estimating an interference includes estimating said interference prior to, by one or more control periods, a period of a motion control of at least one of said feed control axis and said rotary control axis executed in accordance with said position command; and wherein correcting a current command includes correcting said current command at said period of said motion control, based on said interference thus estimated.

7. A method as set forth in claim 5, further comprising, when estimating an interference, changing a calculation constant used to estimate said interference, in response to a change in said eccentric load.

8. A method as set forth in claim 5, further comprising estimating said position and mass information of said eccentric load, based on an interference-basis current command instructed to either one of said feed control axis or said rotary control axis in a state where said interference is not estimated; wherein estimating an interference includes estimating said interference by using said position and mass information thus estimated.

* * * * *